May 14, 1968  E. E. HERMAN  3,383,602
SIGNAL AMPLITUDE SELECTOR
Filed Dec. 5, 1952

INVENTOR
ELVIN E. HERMAN

BY
ATTORNEYS

United States Patent Office 3,383,602
Patented May 14, 1968

3,383,602
SIGNAL AMPLITUDE SELECTOR
Elvin E. Herman, 6864 Glacier Drive,
Riverside, Calif. 92506
Filed Dec. 5, 1952, Ser. No. 324,429
16 Claims. (Cl. 328—117)

This invention relates to pulse discriminating apparatus wherein a group of simultaneous pulses are distinguished according to amplitude.

It is an object of the present invention to discriminate between pulses in a group of simultaneous pulses, the individual pulses differing in amplitude, in order to select from the group the pulse having the highest amplitude and to reject positively the remaining pulses.

A further object of the present invention is to provide in pulse discriminating apparatus an identifying output pulse for the strongest of a group of simultaneous input pulses concomitant with a common output to indicate the occurrence of the pulse group.

Another object of the present invention is to provide in pulse discriminating apparatus an identifying output for the strongest of a group of simultaneous input pulses wherein the identifying output pulse has a constant amplitude regardless of input pulse amplitudes.

A further object of the present invention is to provide a pulse discriminating and peak selector apparatus which has a negligible recovery time to permit operation on high duty cycles.

Figure 1:
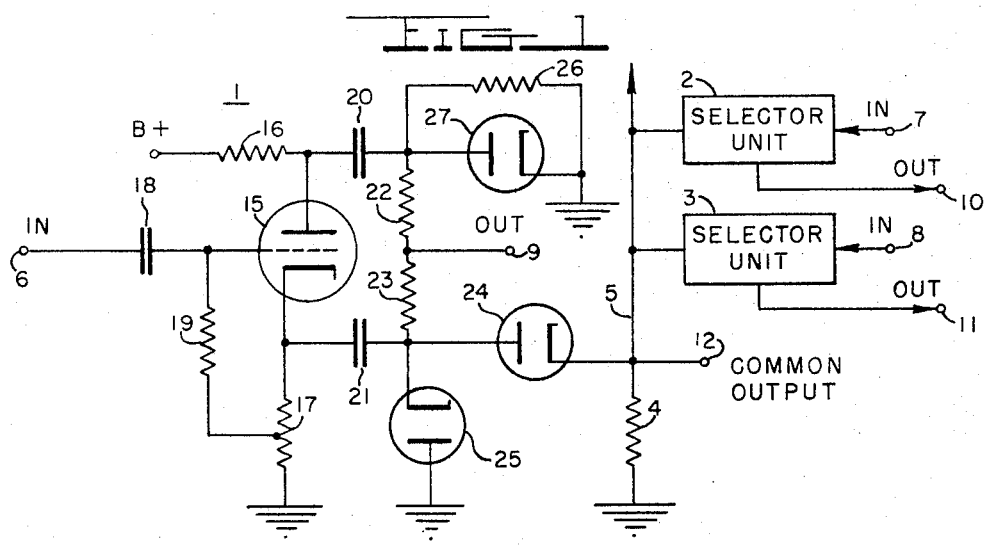
Figure 2:
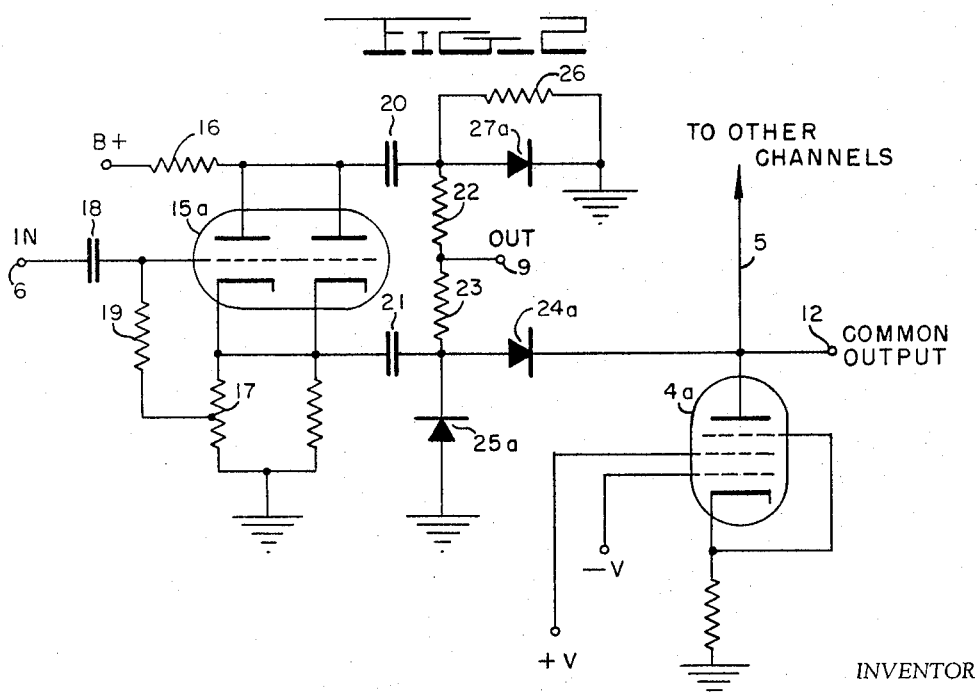

Other objects of the present invention will become apparent from the following detailed description when taken in conjunction with the drawings in which:

FIGURE 1 is a schematic diagram of a pulse discriminating and peak selector apparatus illustrating the principles of the present invention, FIGURE 2 is a schematic diagram of a modified form of the apparatus shown in FIGURE 1.

It is contemplated that the peak pulse selector of the present invention is to be used in applications where the group of pulses, from which the pulse having the highest amplitude is to be selected, is either periodically or aperiodically recurrent with individual pulses having varying relative amplitudes from group to group. The number of pulses in successive groups may be variable, however, up to a predetermined maximum. Likewise the duration of the pulses may vary from group to group but are preferably all of the same duration in any given group. To accommodate the pulse group, individual peak selector units are provided, corresponding in number to the maximum number of pulses in a group. Each of the selector units receives a respective pulse in the group and each is coupled to a common load which effects an interaction between the units resulting in an output pulse only from the individual selector unit receiving the highest level input.

An example of a type of system to which the present invention may be adapted is disclosed in the copending application Ser. No. 279,679 for Height Finding Radar System, filed Mar. 31, 1952, by A. A. Varela. This system, in part, accomplishes aerial target height finding by the provision of a series of vertically stacked, divergent receiving beams and the determination of which one of the pairs of adjacent beams receives the greatest energy from the energy reflecting target. The latter function may be simply accomplished by coupling the selector units referred to above to the output of each pair of adjacent beams, respectively, of the Varela system. Other fields of utility of the present invention will, of course, become apparent to those skilled in the art.

Referring now to FIGURE 1, three selector units 1, 2 and 3, unit 1 being shown schematically and units 2 and 3 in block, are connected to common load 4 by line 5. It is to be understood, however, that additional units may be provided according to the maximum number of pulses expected in any simultaneous pulse group. The input pulses to be discriminated are applied to the selector units at respective input terminals 6, 7 and 8. Dependent upon which of the input pulses has the greatest amplitude, an output pulse appears at the corresponding one of respective output terminals 9, 10 or 11. Common terminal 12, connected to the common line 5 to which all the selector units are coupled, supplies an output pulse coincident with an output from any one of the selector units.

Similar to unit 1 each of the selector units basically includes a vacuum tube 15 which is both plate and cathode loaded by impedance elements 16 and 17 to thereby provide phase splitter operation. More particularly tube 15 is operated as a typical Class A linear amplifier with, however, provisions for obtaining a cathode output opposite in phase, but comparable in amplitude, to that of the plate circuit. Thus, either plate resistor 16 or cathode resistor 17 or both may be adjustable so that when a signal pulse is applied to the grid of tube 15, from input terminal 6 through the conventional input circuit including condenser 18 and resistor 19, the positive voltage pulse at the cathode may be made commensurate in magnitude with the negative pulse at the plate. The cathode and plate of tube 15 are coupled through blocking condensers 20 and 21 to bridging resistors 22 and 23 which are so chosen relative to resistors 16 and 17 as to form a balanced four leg bridge circuit, resistors 16 and 17 forming one pair of bridge legs and resistors 22 and 23 forming the other pair of bridge legs. As thus constituted the plate and cathode outputs cancel at the unit output terminal 9 except when diode 24 conducts, as will be explained hereinafter. If it is desired, bridging resistors 22 and 23 may be adjustable, rather than resistors 16 and 17, to obtain the balanced output at terminal 9.

Diode 24, through blocking condenser 21, couples common load 4 in parallel with resistor 17 in the cathode circuit of tube 15 when the input pulses to the grid of tube 15 exceed the voltage developed across the common load impedance 4. As diode 24 is not direct-current coupled, a discharge path must be provided for coupling condenser 21. Diode 25 provides such a discharge path for the condenser. To this end diode 25 is also connected to condenser 21 but in reverse polarity with respect to diode 24. As thus connected diode 25 operates to effectively provide in series with resistance 17 a relatively low impedance shunt path across condenser 21 between input signal pulses and hence acts substantially as a conventional DC restorer.

In operation of the circuitry thus far described, a group of positive pulses are separately applied to the respective input terminals of the selector units. Considering only three pulses, each of units 1, 2 and 3 will receive a pulse at terminals 6, 7 and 8 respectively. Disregarding for the moment the diodes 24 in each unit and common load 4, the positive input pulses cause a negative pulse at the p'ate and a positive pulse at the cathode of each of the tubes 15, the resultant pulses being of magnitudes respectively dependent upon the input level to the units. As long as the resistor bridges 16, 17, 22 and 23 for each unit are balanced, no output will be seen at output terminals 9 to 11. Assuming, however, that the input pulses to unit 1 has the highest amplitude and thus the greatest cathode output, diode 24 will tend to conduct resulting in unit 1 cathode voltage appearing across load 4 and the shunting of cathode resistor 17 by load resistor 4. The appearance of unit 1 cathode vo'tage across load 4 places a higher positive voltage on the cathodes of the other selector unit diodes 24 than exists at the respective diode plates, the cathode output of unit 1 assumed to be the greatest. Thus, all unit diodes 24, except that for unit 1, remain non-conducting and the corresponding bridges remain balanced resulting in zero output at the corresponding output terminals 10 and 11. At unit 1, however, shunting cathode resistor 17 by load 4 increases the plate output and unbalances the unit bridge with a resultant output voltage at terminal 9 which may be connected to any utilization apparatus (not shown) as desired.

At the end of the group of signal input pulses diode 25 furnishes a discharge path for the charge acquired by condenser 21 during the conduction of diode 24. When the operating duty factor is low, referring to elapsed time between input pulse groups, a full discharge of condenser 21 is effected. Where the duty factor is high, however, the DC restoration action of diode 25 may not be completely effective with the result that a slight charge is retained by condenser 21 from one pulse group to the next. In this case conduction is initiated in diode 25 slightly before the input pulse has returned to zero. This action causes a premature shunting in the cathode circuit by diode 25 which abruptly raises the plate gain of tube 15. The remaining small increment of the input pulse voltage is then greatly over-amplified in the plate circuit. The result is an undesirable selector unit output which is opposite in polarity to normal unit output but of a level comparable to normal output amplitudes. Compensation of this effect may be had, however, by clamping the output coupling circuit from the plate circuit of tube 15 by the addition of diode 27 and resistor 26 in the plate circuit whereby the junction of condenser 20 and resistor 22 is clamped against positive voltage variation.

In the selector shown in FIGURE 1, the output at terminal 9 of the selected unit is dependent in magnitude upon the strength of the incoming signal. In applications where it is preferable to maintain the unit output level constant, advantage may be taken of a conventional pentode tube to provide a load which exhibits constant current characteristics. As shown in FIGURE 2, wherein the parameters are numbered correspondingly to similar parameters of FIGURE 1, pentode 4a has been substituted for resistive load 4 of FIGURE 1 with the result that when any one unit supplies the load current, as a consequence of the selection aforesaid, the output of that unit is independent of the input level to the unit. This follows, inasmuch as cathode resistor 17 is now shunted by a parameter which draws substantially constant shunting current and unbalances resistor bridge 22–23 to the same extent regardless of signal input magnitudes.

With the peak selector circuitry of FIGURE 1 a sharp selection characteristic may be obtained, that is, the application of a strong signal to one of the selector units will cause rejection of all lesser amplitude signals in the other units provided these other signals are down at least the minimum db level capable of being distinguished. To obtain the sharpest selection characteristic as possible, certain design factors, besides frequency response considerations, should be noted. Thus, it will be observed that when a tube, such as tube 15, drives the common load, the cathode gain is reduced slightly as compared to those tubes, or units, not so loaded. This effect may be minimized by using tubes having the highest possible transconductance. Hence, in FIGURE 2, the selector unit tubes 15a are chosen for illustrative purposes to be dual triodes.

Another factor affecting selectivity is the inherent limitations including Edison effect and capacity feed-through, of vacuum tube diodes which tend to detract from best possible performance. Crystal rectifiers, such as type 1N39 or 1N63, will provide the same function in the selector as the diode but with improved performance. Thus, the modified selector of FIGURE 2 includes crystals 24a, 25a and 27a in place of diodes 24, 25 and 27.

It will, of course, be apparent that while the embodiments shown in FIGURES 1 and 2 show the common load impedance coupled to the cathodes of the tubes in the selector units whereby cathode outputs are compared for selection, a comparison of the relative magnitudes of the plate output pulses could be an alternative basis of selection with only slight modification of the circuits described.

Although the embodiments disclosed in the preceding specification are preferred, other modifications will be apparent to those skilled in the art which do not depart from the scope of the broadest aspects of the present invention.

The invention described herein may be manufactured and used by or for the Government of the United States of America for governmental purposes without the payment of any royalties thereon or therefor.

What is claimed is:

1. Apparatus for selecting from a group of simultaneous pulses the pulse having the highest amplitude comprising a plurality of similar impedance networks each having a pulse input and a pulse output terminal, said networks being normally electrically balanced at said output terminals with reference to application of pulses to said input terminals, and means responsive to the relative magnitude of the pulses for unbalancing the network receiving the strongest pulse of said group to produce an output at the corresponding output terminal.

2. Peak selector apparatus for selecting from a group of simultaneous pulses the pulse having the highest amplitude comprising a plurality of bridge circuits each having a pulse input and a pulse output junction, said circuits being normally electrically balanced at said output junctions with respect to application of pulses to said input junctions, and means responsive to the relative magnitude of the pulses for unbalancing the bridge circuit receiving the strongest pulse of said group to cause an output to appear at the corresponding output junction.

3. Peak selector apparatus for selecting from a group of simultaneous pulses the pulse having the highest amplitude comprising a plurality of bridge circuits each having a pulse input and output junction, said circuits being normally electrically balanced at said output junctions with respect to application of said pulses to said input junctions respectively, and a common load impedance for said circuits, and unilateral impedance means for coupling said common load impedance to said circuits whereby said circuits operative to unbalance the bridge receiving the strongest input pulse is balanced to cause thereby an output at the corresponding output junction.

4. Apparatus as set forth in claim 3 wherein the common load impedance includes a constant current vacuum tube pentode.

5. Peak selector apparatus for selecting from a group of simultaneous pulses the pulse having the highest amplitude comprising a plurality of bridge circuits each having a pulse input and a pulse output junction, said circuits being normally electrically balanced at said output junctions with reference to respective application of said pulses to said input junctions, an unbalancing impedance, means responsive to the relative magnitude of the pulses for coupling said impedance to the bridge receiving the strongest input pulse to unbalance the same and for coincidently decoupling said impedance from the remaining bridges.

6. Peak selector apparatus for selecting from a group of simultaneous pulses the pulse having the highest amplitude comprising a plurality of bridge circuits each having a pulse input and a pulse output junction, said circuits being normally electrically balanced at said output junctions with reference to application of said pulses respectively to said input junctions, means operative upon application of said pulses to said input junctions for comparing the voltage developed across one arm of one of said bridges with the voltages developed across the corresponding arms of the other of said bridges, and means responsive to said comparison means for unbalancing the bridge receiving the strongest input to cause thereby an output at the output junction thereof.

7. Peak selector apparatus for selecting from a group of simultaneous pulses the pulse having the greatest amplitude comprising a plurality of bridge circuits each having a pulse input and a pulse output junction, said circuits being normally electrically balanced at said output junctions with reference to application of said pulses to said input junctions respectively, and bridge unbalancing means responsive to the relative magnitude of the voltages developed across corresponding bridge arms upon application of said pulses to said input junctions for unbalancing the bridge receiving the strongest pulse, the unbalancing causing an output pulse at the corresponding output junction.

8. Peak selector apparatus for selecting from a group of simultaneous pulses the pulse having the highest amplitude comprising a plurality of bridge circuits each having a pulse input and a pulse output junction, said circuits being normally electrically balanced at said output junctions with reference to application of pulses to said input junctions, an impedance for comparing the relative magnitude of the voltages developed across corresponding bridge arms upon application of said pulses to said input junctions, and respective unilateral impedance elements coupling said impedance in parallel with corresponding bridge arms of said bridge circuits, the elements being arranged so as to permit current flow to said impedance only from the bridge developing the highest voltage across the coupled bridge arm.

9. Pulse amplitude discriminating apparatus for rejecting pulses below an arbitrary amplitude which may be subject to variation comprising a bridge circuit having a pulse input and a pulse output junction, said bridge normally electrically balanced at said output junction with respect to application of pulses to said input junction, a bridge unbalancing impedance, means for coupling said impedance to said bridge, and means responsive to the magnitude of the pulses for rendering said coupling means ineffective until said pulses at least equal said arbitrary amplitude.

10. Apparatus for selecting from a group of simultaneous pulses the pulse having the highest amplitude comprising a plurality of electron discharge tubes each having at least an anode, a cathode, and a control grid, means for respectively applying said pulses to said control grid, means for deriving a cathode output pulse and a plate output pulse from each of said tubes in response to application of said group of pulses thereto, respective cancellation means coupled to said tubes for balancing out at respective output terminals thereof said cathode and plate output pulses, means for comparing the relative magnitudes of said cathode output pulses, and means responsive to said last named means for rendering ineffective the cancellation means associated with the cathode output pulse having the greatest magnitude, the uncancelled cathode and plate output pulses effecting an output pulse at the corresponding output terminal.

11. Apparatus for selecting from a group of simultaneous pulses the pulse having the highest amplitude comprising a plurality of electron discharge tubes each having at least an anode, a cathode, and a control grid, means for respectively applying said pulses to said control grids, means for deriving a cathode output pulse and a plate output pulse from each of said tubes responsive to the application of said group of pulses thereto, respective network means coupled to said tubes for receiving said cathode and plate output pulses, said networks having respective output terminals electrically balanced with respect to said cathode and plate output pulses, and means responsive to the relative magnitude of the pulses for unbalancing the network associated with the tube receiving the strongest input pulse to effect an output at the corresponding output terminal.

12. Apparatus for selecting from a group of simultaneous pulses the pulse having the highest amplitude comprising a plurality of electron discharge tubes each having at least an anode, a cathode and a control grid, respective impedance networks for said tubes, each network including means for applying a respective one of said pulses to said control grid, a plate impedance, a cathode impedance, and an impedance potentiometer bridging said anode and said cathode, said potentiometer being adjusted so as to cancel at the output terminal thereof the voltage pulses developed across said plate and cathode impedances upon application of a pulse to said control grid, and means responsive to the relative magnitude of the pulses for changing the value of the cathode impedance of the tube receiving the strongest pulse thereby effecting an uncancelled output from the associated potentiometer.

13. Peak selector apparatus for selecting from a group of simultaneous pulses the pulse having the highest amplitude comprising a plurality of electron discharge tubes each having at least an anode, a cathode and a control grid, a network for each tube including means for applying a respective one of said pulses to said control grid, a plate impedance, a cathode impedance, and an impedance potentiometer bridging said anode and said cathode, said potentiometer being adjusted so as to cancel at the output terminal thereof the voltage pulses developed across said plate and cathode impedances upon application of a pulse to said control grid, a load impedance, and means responsive to the relative magnitude of the pulses operative to couple said load impedance to the cathode circuit of the tube receiving the strongest pulse for varying the plate and cathode outputs thereof, the variation of said plate and cathode outputs effecting an uncancelled output from the associated potentiometer.

14. Apparatus for selecting from a group of simultaneous pulses the pulse having the highest amplitude comprising a plurality of electron discharge tubes each having at least an anode, a cathode and a control grid, respective impedance networks for said tubes, each network including means for applying a respective one of said pulses to said control grid, a plate impedance, a cathode impedance, and an impedance network coupled across said anode and cathode and forming with said plate and cathode impedance a bridge circuit, said bridge having an intermediate output terminal thereon at a point which is normally electrically balanced with respect to voltage pulses developed across said plate and cathode impedances upon application of a pulse to said control grid, a load impedance, and respective unilateral impedance elements coupling said impedance to said cathodes in shunt with said cathode impedances, said elements being arranged so as to permit current flow through said impedance only from the tube having the highest cathode output.

15. Apparatus as set forth in claim 14 wherein said common impedance includes a constant current vacuum tube pentode.

16. Pulse amplitude discriminating apparatus for rejecting pulses below an arbitrary amplitude which may be subject to variation comprising a bridge circuit having a pulse input and a pulse output junction, said bridge normally being electrically balanced at said output junction with respect to application of a pulse to said input junction, and bridge unbalancing means responsive to the relative magnitude of pulses operative to unbalance said circuit only upon application thereto of a pulse at least equalling said arbitrary amplitude.

References Cited
UNITED STATES PATENTS

| | | | |
|---|---|---|---|
| 2,488,193 | 11/1949 | Hughes | 250—20.7 |
| 2,557,729 | 6/1951 | Eckert | 250—27 |
| 2,584,138 | 2/1952 | Lichtman | 250—27 |
| 2,612,550 | 9/1952 | Jacobi | 250—27 |

ARTHUR GAUSS, *Primary Examiner.*

WILLIAM J. WILES, FREDERICK M. STRADER,
*Examiners.*

D. D. FORRER, *Assistant Examiner.*